United States Patent [19]

Habicht

[11] Patent Number: 5,505,661

[45] Date of Patent: Apr. 9, 1996

[54] COUPLING FOR CONNECTING AXIALLY MISALIGNED AND ROTATABLE COMPONENTS HAVING DISENGAGING PROPERTIES

[76] Inventor: Helmut Habicht, 15 Royal Park Ter., Hillsdale, N.J. 07642

[21] Appl. No.: 272,138

[22] Filed: Jul. 8, 1994

[51] Int. Cl.⁶ .................................................. F16D 3/16
[52] U.S. Cl. ................................ 464/119; 464/114
[58] Field of Search ........................ 464/136, 112, 464/106, 114, 104, 102, 119; 271/276

[56] References Cited

U.S. PATENT DOCUMENTS

| | | | |
|---|---|---|---|
| 1,942,746 | 1/1934 | Degener | 464/136 X |
| 3,528,263 | 9/1970 | Stern | 464/119 X |
| 4,472,157 | 9/1984 | Sindelar | 464/136 X |

Primary Examiner—Daniel P. Stodola
Assistant Examiner—Emmanuel M. Marcelo
Attorney, Agent, or Firm—Patrick J. Pinto

[57] ABSTRACT

A coupling for connecting axially misaligned and rotatable shafts that has disengaging properties. This coupling includes a driver member which is adapted for attaching to a driving shaft, this driver member has a cup portion and a pair of through apertures for slidably engaging and retaining a pair of first pin members of a spider member. A pair of second pin members of the spider member engages a pair of open ended and elongated apertures of a driven member. This driven member is adapted for attaching to a driven shaft. This coupling allows for automatic selective engagement and disengagement of the spider member from the driven member. A biasing member returns the spider member to a substantially centered position during disengagement.

12 Claims, 2 Drawing Sheets

5,505,661

COUPLING FOR CONNECTING AXIALLY MISALIGNED AND ROTATABLE COMPONENTS HAVING DISENGAGING PROPERTIES

BACKGROUND OF THE INVENTION

1. Field of the Invention

With regard to the classification of art, this invention is believed to be found in the general class entitled "Couplings for Rotary Shafts and more particularly to those subclasses pertaining to those coupling which accommodate misaligned axes.

2. Description of Related Art

Couplings for connecting rotary shafts are well known in the art. It is also well known to connect axially misaligned rotary shafts with couplings which are of the Oldham type. Most of the known Oldham couplings are not used in situations which may require automatic engagement and disengagement of the rotary shafts. One known example of a disengageable coupling is described in U.S. Pat. No. 5,022,645, which issued to Green on Jun. 11, 1991. It is believed that the coupling disclosed in the Green patent is not applicable for automatic engagement after disengagement due to the fact that the slider falls to its lowermost position due to gravity.

It has been determined that there is a need for a coupling which will automatically engage and disengage when needed. It has also been determined that there is a need for a coupling which may be used for connecting one drive means with interchangeable driven components.

The present invention overcomes limitations found in the known prior art. The disclosed coupling provides a coupling which may be used to individually drive several driven components. This coupling of the present invention will automatically engage the driven portion of the coupling while allowing for misalignment of the rotary shafts. The spider portion of the coupling returns to a substantially centered condition with respect to the drive means.

SUMMARY OF THE INVENTION

This invention may be summarized in part with respect to its objects. It is an object of this invention to provide and it does provide a coupling which is capable of automatically engaging and disengaging rotary shafts while accommodating misalignment of axes.

It is another object of this invention to provide and it does provide a coupling which may be used for automatically engaging interchangeable driven components with a single drive means.

It is yet another object of this invention to provide and it does provide a coupling for misaligned rotary shafts which returns a spider member to the vicinity of the center of the drive means during a disengaged condition.

It is still another object of this invention to provide and it does provide a coupling which is adapted for mounting on the shaft of a drive means. The drive means may be selectively moved from a engaged position to a disengaged position.

In summary, the present invention provides a coupling for connecting axially misaligned and rotatable components having disengaging properties comprising: (a) a driver member that is adapted for attaching to a driving means, the driver member includes a cup portion, and a pair of through apertures, each of the through apertures being formed through diametrically opposed portions of a sidewall of said cup portion at substantially ninety degrees to a rotating axis of said driving means; (b) a spider member including a main body, a pair of first pin members, and a pair of second pin members, each of the first pin members being radially disposed at one end of said main body in axial alignment to each other, each of the second pin members being disposed at a distal end of the main body, the second pin members being axially aligned with each other at ninety degrees to the pair of first pin members; (c) a plurality of biasing means, an axis of each biasing means being in substantially parallel alignment with said first pin members, one end of each biasing means being guided by a first guide means of the driver member, and a second end of each biasing means being guided by a second guiding means of the spider member, (d) a driven member being adapted for attaching to a driven means, the driven member including a recess portion and a pair of elongated apertures, each of the elongated apertures having an open end and each of the elongated apertures being formed in diametrically opposite walls of the recess portion, each of the elongated apertures being in axial alignment to each other and sized for accepting the second pin members in sliding engagement, each of the elongated apertures having a lead-in portion at its open end, and (e) an anti-rotation means for limiting the degree of rotational movement of the first pair of pin members with respect to the through apertures of the driver member while allowing axial movement therebetween; and wherein the spider member is retained by the driver member during any disengagement from the driven member and the spider member is returned to a substantially centered position by the biasing means during any disengagement of the second pair of radial pins from the elongated apertures of the driven member.

In addition to the above summary, the following disclosure is intended to be detailed to insure adequacy and aid in the understanding of the invention. However, however this disclosure which may show various embodiments of the invention is not intended to describe each new inventive concept which may arise. Specific embodiments have been chosen that are believed to show at least one best mode for the coupling of the present invention. These specific embodiments may be schematic for the purpose of illustration and description as shown in the accompanying drawings.

Figure 2:
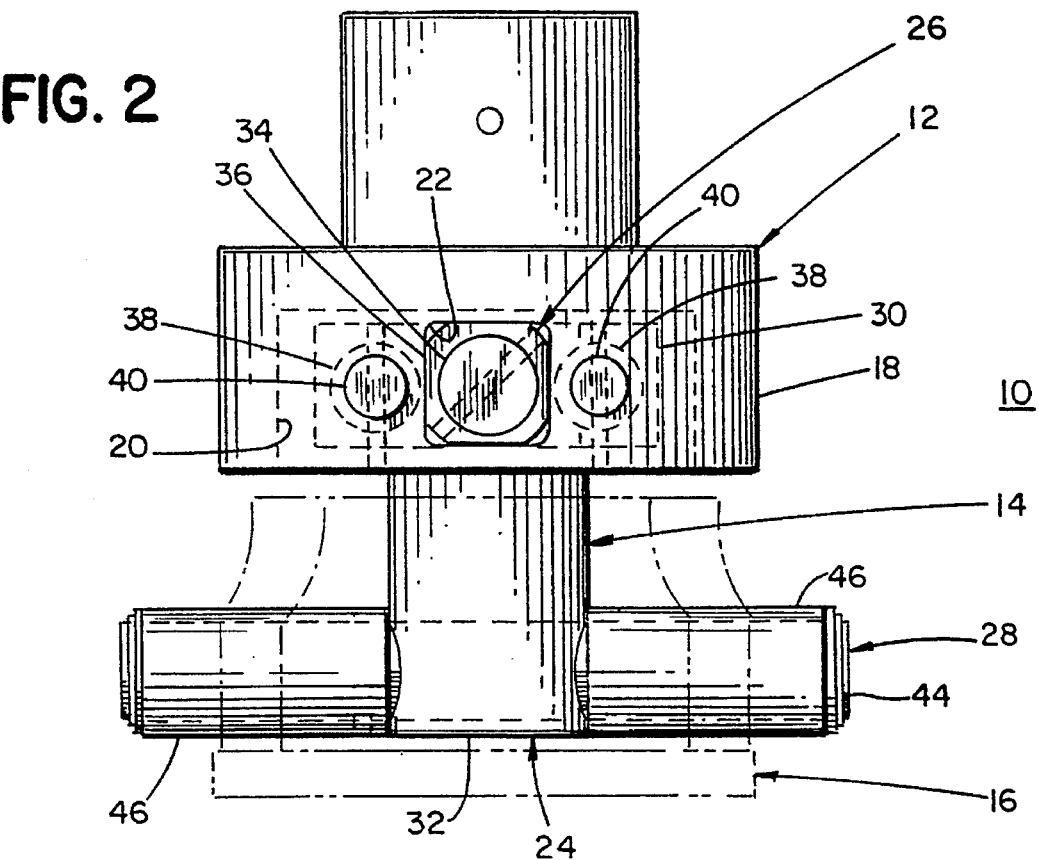
FIG. 2 represents a plan view, of the present invention.

In the following description and in the claims, various details are identified by specific names for convenience. These names are intended to be generic in their application while differentiating between the various details. Corresponding reference numbers refer to like members throughout the several figures of the drawing.

The drawing accompanying and forming a part of this specification disclose details of construction for the sole purpose of explanation. It is to be understood that structural details may be modified without departing from the concept and principles of the invention as claimed. This invention may be incorporated in other structural forms than shown.

DETAILED DESCRIPTION OF THE INVENTION

Figure 1:
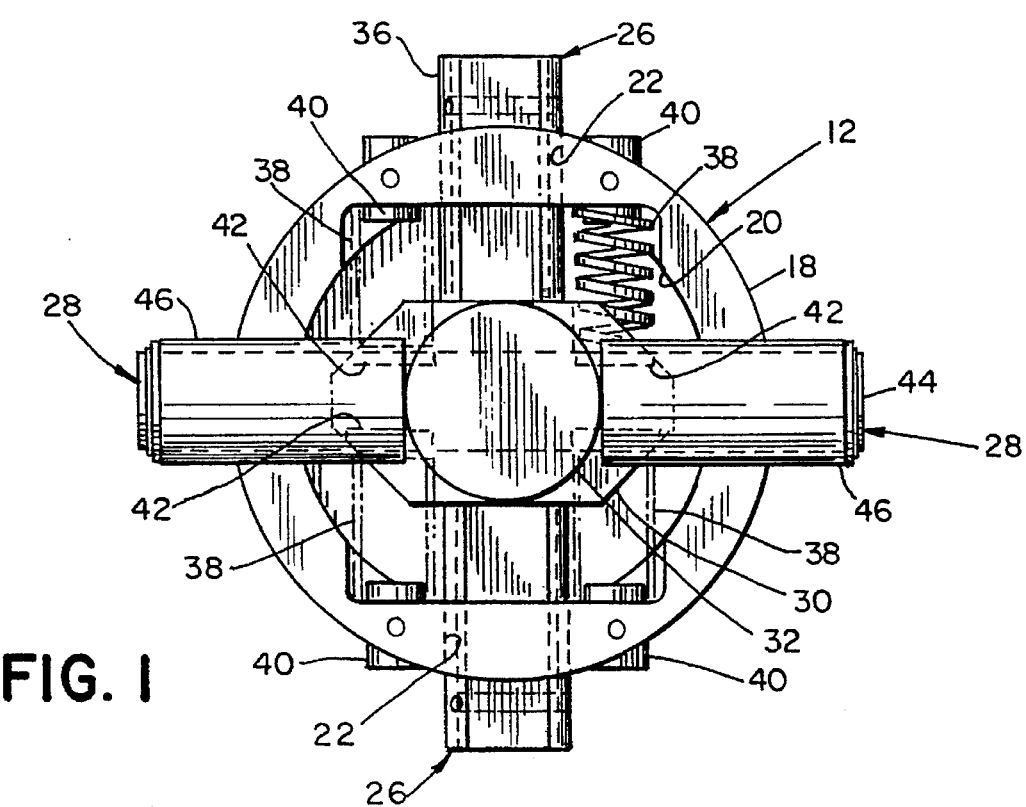
FIG. 1 represents a front elevation view of a coupling of the present invention.
Figure 3:
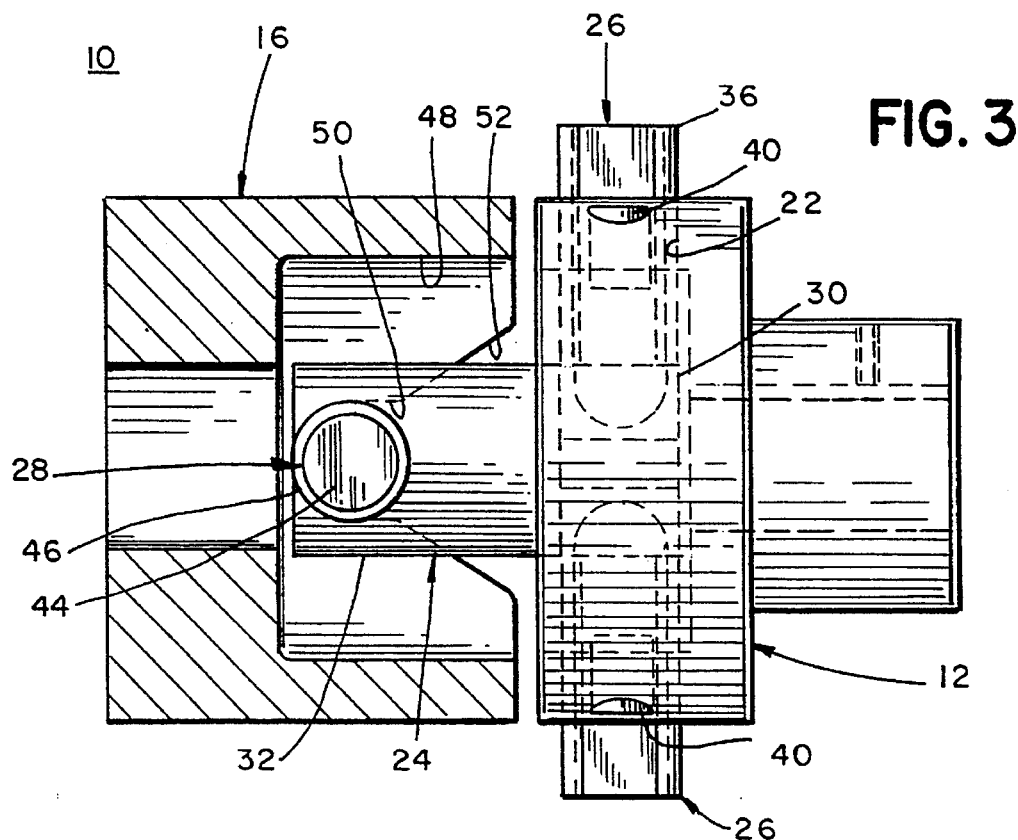
FIG. 3 represents a side elevation, which is partly in section and partly diagrammatic, of the present invention.

Referring to FIGS. 1, 2 and 3, a coupling of the present invention is generally identified as 10. This coupling 10 includes a driver member 12, a spider member 14, and a driven member 16. The driver member 12 is adapted for attaching to a shaft or hub of a rotary driving means, such as an electric, pneumatic or hydraulic motor. The attachment may be by conventional means such as a setscrew and key, tapered bushing or the like.

One end of the driver member 12 is configured to form a cup-like portion 18. The walls 20 of the cup portion have a pair of through apertures 22 formed therein. The axis of each of the through apertures 22 must be in line with each other, while simultaneously being formed in diametrically opposed portions of the walls 20. The axis of the through apertures 22 should also be at right angles to the axis of rotation of the driving means.

The spider member 14 includes an elongated main body 24, first pin members 26, and second pin members 28. The first pin members 26 are radially disposed on one end 30 of the main body 24. Each of the first pin members 26 must be in axial alignment to each other. The second pin members 28 are radially disposed at a distal end 32 of the main body 24. The axis of the second pin members 28 must be in alignment with each other while being arrayed at ninety degrees to the axis of the pair of first pin members 26. The preferred shape of the distal end 32 is cylindrical, but other shapes may be used.

It is preferred that the first pin members 26 include an elongated cylindrical core 34 and an outer sleeve member 36. The outer sleeve member 36 should be made of a suitable bearing material. It is preferred that the bearing material be of the type that is impregnated with a lubricant. This preferred arrangement allows for easy assembly. The sleeve member 36 may be fastened to the cylindrical core 34, by using a pin, setscrew or the like.

It is preferred that the assembly formed by the driver member 12 and spider member 14 include an anti-rotation means for limiting the degree of rotation of the spider member 14 with respect to the through apertures 22. It has been found that making the outer surface of the outer sleeve member 36 non-circular provides the desired results. One preferred example of a non-circular outer surface is disclosed in the drawing, but an outer surface with a single flat, or an elliptical shape would also provide the desired anti rotation capabilities. It is also preferred that the first pins 26 be alike but that is not necessary to provide the desired anti-rotation characteristics.

A plurality of biasing means 38, such as compression springs, are used to return the spider member 14 to the vicinity of the axis of the driver means when the coupling 10 is in a disengaged condition. It is preferred that the 4 compression springs 38 be of the same size and type. Only one of the four springs is shown in detail for ease of illustration. The balance of the springs 38 are shown in dashed outline. One end of each spring 38 is retained by a first guide means 40, such as a post. A second end of each spring is retained by a second guide means 42, such as a blind aperture, counterbore, or the like, which is formed in the first end 30 of the main body 24.

It is preferred that the second pin members 28 include an elongated cylindrical post 44 and cylindrical sleeve members 46. It is also preferred that the cylindrical sleeve members 46 be journalled on the cylindrical post 44 and configured for resisting thrust loads in the direction of the axis of the post 44. Suitable thrust bearings and retaining rings may be used.

The driven member 16 includes a means for attachment to a shaft or hub of a component to be driven. This driven member 16 includes a recess portion 48, and a pair of elongated apertures 50. Each of the elongated apertures 50 has an open end for receiving the second pins 28. Each of the elongated apertures 50 is formed in alignment with each other along diametrically opposite walls of the recess portion 48. It is preferred that the elongated apertures 50 include a chamfered portion 52. One example of a chamfered portion provides an enlarged mouth having a width in the vicinity of 6.9 cm. (2.75 in>) for axial displacement up to 1.85 cm. (0.75 in) from the theoretical centerline.

Figure 4:
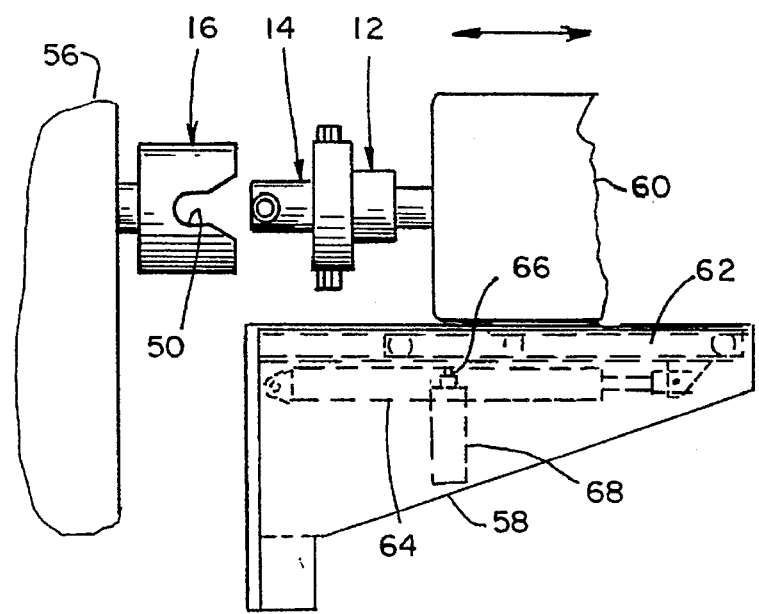
FIG. 4 represents a side elevation, which is partly diagrammatic, of one typical application of the present invention.

The primary application for the coupling 10 of the present invention is diagrammatically illustrated in FIG. 4. A component to be driven 56, such as a container with internal paddles is brought into position and secured within an apparatus frame, not shown. The component to be driven 56 usually has a driven member 16 attached thereto. A driver means support 58 is fastened to the apparatus frame. A driving means such as a motor 60 is mounted to a carriage member 62 which is selectively positioned along a plane in the direction of the arrows. A pneumatically operated linear actuator 64 is used for positioning the carriage member 62 with respect to its driver means support 58. During movement of the carriage member 62 towards the driven member 16, the motor 60, with the driver member 12 and spider member 14 attached thereto, is slowly rotated. This slow rotation allows the second pins 28 to become aligned with the elongated apertures 50. After this initial engagement, the second pins 28 will become fully seated in the through aperture 50 by further leftward movement of the carriage member 62. The spider member 14 is automatically displaced, as necessary, with respect to the axis of the driver member 12. This displacement of the spider member 14 accommodates misalignments of the axes of the driver member 12 and the driven member 16. A detecting means, not shown, is used to provide a control signal that the second pins 28 are fully seated into the elongated apertures. An example of a detecting means is a electrical or pneumatic limit switch or the like. Only after fully seating of the second pins 28 has been determined, a locating pin 66 engages a mating aperture in the carriage 62. The movement of this locating pin 66 is controlled by a second linear actuator 68. The engagement of the locating pin 66 with the mating hole in the carriage member 62 positively hold the components of the clutch in a driving configuration. The preferred motor means 60 should be capable of variable speed adjustment. This variable speed ability allows the driven component to be rotated at a predetermined higher rotation after the low initial engaging rotation. One example of a variable speed driving means is an AC or DC electric motor.

Directional terms such as "front", "back", "in", "out", "leftward", "rightward", and the like are applicable to the embodiments shown and described in conjunction with the drawings. These terms are merely used for the purpose of description in connection with the drawings and do not necessarily apply to the position in which the coupling of the present invention may be used.

While these particular embodiments of an improved coupling have been shown and described, it is to be understood that the invention is not limited thereto and protection is sought to the broadest extent that the prior art allows.

What is claimed is:

1. A coupling for connecting axially misaligned and rotatable components having disengaging properties comprising
   (a) a driver member being adapted for attaching to a driving means, said driver member including a cup portion, and a pair of through apertures, each of said through apertures being formed through diametrically opposed portions of a sidewall of said cup portion at substantially ninety degrees to a rotating axis of said driving means;
   (b) a spider member including a main body, a pair of first pin members, and a pair of second pin members, each of said first pin members being radially disposed at one end of said main body in axial alignment to each other, each of said second pin members being disposed at a distal end of said main body, said pair of said second pin members being axially aligned with each other at ninety degrees to said pair of said first pin members;
   (c) a plurality of biasing means, an axis of each biasing means being in substantially parallel alignment with said pair of first pin members, one end of each biasing means being guided by a first guide means of said driver member, and a second end of each biasing means being guided by a second guiding means of said spider member,
   (d) a driven member being adapted for attaching to a driven means, said driven member including a recess portion and a pair of elongated apertures, each of said elongated apertures having an open end and each of said elongated apertures being formed in diametrically opposing walls of said recess portion, each of said elongated apertures being in axial alignment to each other and sized for accepting said second pin members in sliding engagement, each of said elongated apertures having a lead-in portion at its open end, and
   (e) an anti-rotation means for limiting a degree of rotational movement of said first pair of pin members with respect to said through apertures of said driver member while allowing axial movement therebetween; and
   wherein said spider member being retained by said driver member during any disengagement from said driven member and said spider member is returned to a substantially centered position by said biasing means during any disengagement of said second pin members from said elongated apertures of said driven member.

2. A coupling as recited in claim 1 wherein said anti-rotation means includes at least one sleeve member, said sleeve member being removably attached to one of said first pin members, and at least one of said through apertures of said driver member is configured for closely mating with at least one flat formed on an outer surface of said sleeve member.

3. A coupling as recited in claim 1 wherein each of said biasing means includes a compression spring.

4. A coupling as recited in claim 3 wherein each of said first guide means is a guide pin which is removably attached to said driver member and said guide pin is sized to guide an inside diameter of said compression spring.

5. A coupling as recited in claim 3 wherein each of said second guide means is a counterbore having a predetermined depth, said counterbore being formed in the main body of said spider and said counterbore being sized to guide an outside diameter of said compression spring.

6. A coupling as recited in claim 1 wherein said driver means further includes a drive shaft of a motor, said motor being mounted on a motor mounting plate, said mounting plate being secured to a carriage member, said carriage member having a means for selectively moving said driving member and said retained spider from and to an engaged position with said driven member.

7. A coupling as recited in claim 6 wherein said means for selectively moving includes a selectively operated linear actuator.

8. A coupling as recited in claim 7 wherein said coupling is maintained in a fully engaged position by a locating pin member, said location pin member being reciprocally mounted to a stationary mounting plate and arrayed for engaging a locating aperture in said carriage plate.

9. A coupling as recited in claim 6 wherein said anti-rotation means includes at least one sleeve member, said sleeve member being removably attached to one of said first pin members and at least one of said through apertures of said driver member is configured for closely mating with at least one flat formed on an outer surface of said sleeve member.

10. A coupling as recited in claim 6 wherein each of said biasing means includes a compression spring.

11. A coupling as recited in claim 10 wherein each of said first guide means is a guide pin which is removably attached to said driver member and said guide pin is sized to guide an inside diameter of said compression spring.

12. A coupling as recited in claim 10 wherein each of said second guide means is a counterbore having a predetermined depth, said counterbore being formed in the main body of said spider and said counterbore being sized to guide an outside diameter of said compression spring.

* * * * *